United States Patent [19]
Strolle et al.

[11] Patent Number: 5,706,057
[45] Date of Patent: Jan. 6, 1998

[54] PHASE DETECTOR IN A CARRIER RECOVERY NETWORK FOR A VESTIGIAL SIDEBAND SIGNAL

[75] Inventors: Christopher Hugh Strolle, Glenside, Pa.; Steven Todd Jaffe, Freehold, N.J.

[73] Assignee: RCA Thomson Licensing Corporation, Princeton, N.J.

[21] Appl. No.: 704,788

[22] PCT Filed: Mar. 13, 1995

[86] PCT No.: PCT/US95/03133

§ 371 Date: Sep. 5, 1996

§ 102(e) Date: Sep. 5, 1996

[87] PCT Pub. No.: WO95/26105

PCT Pub. Date: Sep. 28, 1995

[30] Foreign Application Priority Data

Mar. 21, 1994 [GB] United Kingdom ............... 9405487

[51] Int. Cl.$^6$ ............................................. H04N 7/04
[52] U.S. Cl. ............................... 348/426; 348/470; 348/537; 348/725; 375/326
[58] Field of Search ........................... 348/426, 469, 348/470, 471, 512, 518, 536, 537, 725, 726, 731, 735; 375/270, 321, 326, 327; 329/357; 455/204, 203, 47; H04N 7/04, 9/45, 7/00

[56] References Cited

U.S. PATENT DOCUMENTS

| | | | |
|---|---|---|---|
| 3,795,865 | 3/1974 | Armstrong | 375/270 |
| 5,170,415 | 12/1992 | Yoshida et al. | 375/80 |
| 5,228,060 | 7/1993 | Uchiyama | 375/75 |
| 5,386,239 | 1/1995 | Wang et al. | 348/472 |
| 5,410,573 | 4/1995 | Taga et al. | 375/376 |
| 5,588,025 | 12/1996 | Strolle et al. | 375/316 |

OTHER PUBLICATIONS

Mueller and Muller, Timing Recovery in Digital Synchronous Data Receivers, IEEE Transactions on Communications, May 1976, pp. 516–531.

The Grand Alliance HDTV System Specification (Draft Document) submitted to the ACATS Technical Subgroup, as published in the 1994 Proceedings of the 48th Annual Broadcase Engineering Conf. Proceedings Mar. 20–24, 1994.

Davis et al., "Pseudo-Coherent Phase Shift Keyed Demodulator," ICASSP '89: Acoustics, Speed & Signal Processing Conference, pp. 1388–1391, Feb. 1989.

Kuan et al, "An Adaptive Notch-Filter-Based Frequency-Difference Detector and Its Applications", IEEE Transactions on Communications, vol. 43, No. 11, pp. 2784–2793, Nov. 1995.

Kempez, "A Comparison of QAM and VSB for Hybrid Fiber/Coax Digital Transmission", IEEE Transactions on Broadcasting, vol. 41, No. 1, pp. 9–16, Mar. 1995.

*Primary Examiner*—John K. Peng
*Assistant Examiner*—Jeffrey S. Murrell
*Attorney, Agent, or Firm*—Joseph S. Tripoli; Eric P. Herrmann; Ronald H. Kurdyla

[57] ABSTRACT

A television signal receiver for processing an HDTV signal transmitted in a vestigial sideband (VSB) format with a one-dimensional data constellation includes a first carrier recovery network (18), an equalizer (20), and a second carrier recovery network (22, 30, 62). A multiple stage quantizer network (50, 66) exhibiting progressively finer resolution is associated with the operation of the equalizer for providing blind equalization without need of a "training" signal. The second carrier recovery network includes a phase detector (30) wherein a one-symbol delayed (312) input signal and a quantized (310) input signal are multiplied (316), and an unquantized input signal and a quantized (310) one-symbol delayed (314) input signal are multiplied (316), and an unquantized input signal and a quantized (310) one-symbol delayed (314) input signal are multiplied (318). Signals produced by the multiplication are subtractively combined (320) to produce an output signal representing carrier phase error.

7 Claims, 4 Drawing Sheets

| | | | | | | | | |
|---|---|---|---|---|---|---|---|---|
| ORIGINAL VSB DATA CONSTELLATION | -7 | -5 | -3 | -1 | 1 | 3 | 5 | 7 |
| | | | | | | | | |
| FIRST CLUSTERS | [-7 | -5 | -3 | -1] | [1 | 3 | 5 | 7] |
| DECISION REGIONS | [-INF., 0] | | | | [0, +INF] | | | |
| DECISION DEVICE OUTPUTS | -4 | | | | 4 | | | |
| | | | | | | | | |
| SECOND CLUSTERS | [-7 | -5] | [-3 | -1] | [1 | 3] | [5 | 7] |
| DECISION REGIONS | [-INF. 4] | | [-4 0] | | [0 4] | | [4 INF.] | |
| DECISION DEVICE OUTPUTS | -6 | | -2 | | 2 | | 6 | |
| | | | | | | | | |
| THIRD CLUSTERS | [-7] | [-5] | [-3] | [-1] | [3] | [5] | [7] | |
| DECISION REGIONS | [-INF, 6] | [-6, -4] | [-4, -2] | [-2, 0] | [0, 2] | [2, 4] | [4, 6] | [6, INF] |
| DECISION DEVICE OUTPUTS | -7 | -5 | -3 | -1 | 1 | 3 | 5 | 7 |

FIG. 4

PHASE DETECTOR IN A CARRIER RECOVERY NETWORK FOR A VESTIGIAL SIDEBAND SIGNAL

FIELD OF THE INVENTION

This invention concerns a digital signal processing system. In particular, the invention concerns a phase detector in a carrier recovery network for a vestigial side band (VSB) signal such as may be modulated with high definition television (HDTV) information, for example.

BACKGROUND OF THE INVENTION

The recovery of data from a VSB or a QAM (Quadrature Amplitude Modulated) signal at a receiver requires the implementation of three functions: timing recovery for symbol synchronization, carrier recovery (frequency demodulation) and equalization. Timing recovery is the process by which the receiver clock (timebase) is synchronized to the transmitter clock. This permits the received signal to be sampled at the optimum point in time to reduce the chance of a slicing error associated with decision-directed processing of received symbol values. Carrier recovery is the process by which a received RF signal, after being frequency shifted to a lower intermediate frequency passband, near baseband, is finally frequency shifted to baseband to permit recovery of the modulating baseband information. Equalization is a process which compensates for the effects of transmission channel disturbances upon the received signal. More specifically, equalization removes baseband intersymbol interference (ISI) caused by transmission channel disturbances including the low pass filtering effect of the channel. ISI causes the value of a given symbol to be distorted by the values of preceding and following symbols.

For QAM signals, timing recovery is usually the first function implemented in a receiver. The timing is recovered from either the intermediate passband signal or from a near-baseband signal, i.e., a baseband signal with a carrier offset that is corrected by a carrier recovery network. In either case, timing can be established prior to baseband demodulation. The carrier recovery demodulation process is usually a two step process. First, the passband signal is shifted to near-baseband by a frequency shifter which uses a "best guess" as to what the frequency offset is between the incoming passband signal and the desired baseband signal. This frequency shift is usually performed by analog circuits; i.e., prior to analog to digital conversion in the receiver. Next, equalization is performed on this near-baseband signal. Finally, carrier recovery is performed which removes any residual frequency offsets from the near-baseband signal to produce a true baseband output signal. This function is performed by digital receiver circuits. The equalizer is inserted between a first local oscillator which performs the shifting to near-baseband and the carrier recovery loop network. This is because the carrier recovery process typically is a decision-directed process (as known) that requires at least a partially open "eye" which is provided by the equalizer function.

A QAM signal conveying digital information is represented by a two-dimensional data symbol constellation defined by Real and Imaginary axes. In contrast, a VSB signal is represented by a one-dimensional data symbol constellation wherein only one axis contains quantized data to be recovered at a receiver. Synchronous demodulation of a VSB signal has usually been accomplished with the aid of a pilot signal. The pilot signal facilitates demodulating the VSB signal to baseband in one step, typically without residual phase or frequency errors. Performing the functions of timing recovery, demodulation and equalization in the order they are performed for QAM signals does not work for VSB signals using conventional techniques. For QAM signals, several timing recovery methods are known which are independent of the frequency offset between the near-baseband signal and the baseband signal. However, it is generally accepted that frequency independent timing recovery is not feasible for VSB signals. For this reason, in VSB systems, absolute demodulation to baseband has historically been implemented first.

One example of a VSB system including a pilot component is the Grand Alliance HDTV transmission system recently proposed for the United States. This system employs a VSB digital transmission format for conveying a packetized datastream, and is being evaluated in the United States by the Federal Communications Commission through its Advisory Committee of Advanced Television Service (ACATS). A description of the Grand Alliance HDTV system as submitted to the ACATS Technical Subgroup on Feb. 22, 1994 (draft document) is found in the 1994 Proceedings of the National Association of Broadcasters, 48th Annual Broadcast Engineering Conference Proceedings, Mar. 20–24, 1994. The carrier recovery network in an 8-VSB system, such as in the transmission system used by the Grand Alliance, may not be able to track carrier errors in the presence of moderate phase noise such as may be associated with oscillators found in consumer-grade receiver tuners. This necessitates the use of a secondary carrier recovery network to remove residual phase noise.

In passband digital communications systems, the carrier is typically tracked with a Phase Locked Loop (PLL). A phase detector is an important part of the PLL. The phase detector determines the amount of phase correction needed and produces a corresponding error signal which, when multiplied with the incoming signal, demodulates the signal to baseband. A decision-directed phase detector (DDPD) is often used in QAM systems. Such a phase detector measures the phase angle as the angular error between the incoming signal and a quantized version of the incoming signal. In a QAM signal, both the in-phase and quadrature components convey data symbols, and both of these components are created using Nyquist filtering at a transmitter. This implies that when no intersymbol interference (ISI) is present, the expected values of both the in-phase and quadrature components of the QAM signal are discrete values from the quantizer. Thus a DDPD can accurately measure phase error by measuring the angular difference between the quantizer decisions and the incoming signal from the equalizer to the quantizer.

This technique is not directly applicable to VSB signals. Unlike a QAM signal, in a complex VSB signal only the in-phase component (the Real component of the complex signal) has been subjected to Nyquist filtering at the transmitter. The quadrature component (the Imaginary component) is subjected to VSB filtering, which generally is not Nyquist filtering. The implication of such filtering is that, even in the absence of ISI, the quadrature channel contains a continuum of expected values at the optimum sample point for the in-phase component. The use of a conventional DDPD (such as may be used in a QAM system) is not applicable to a VSB system since no discrete symbol values, eg., quantized samples, are available from the quadrature channel. Accordingly, there is disclosed herein a phase detector that is particularly useful in the carrier recovery network of VSB data communications systems.

SUMMARY OF THE INVENTION

In accordance with the principles of the present invention, a phase detector suitable for use in carrier recovery network of VSB signal processing systems is disclosed. The phase detector includes a quantizer, a delay network for providing delayed symbols, and first and second multipliers for producing first and second symbols in response to combinations of input, quantized and delayed symbols. The first and second signals are combined to produce a phase error signal.

In a disclosed preferred embodiment, the phase detector responds to a real-only VSB signal. The phase error signal is applied to a control input of an equalizer which is preceded in the signal path by another carrier recovery network.

BRIEF DESCRIPTION OF THE DRAWINGS

In the drawings:

FIG. 4 illustrates a symbol decision process associated with a blind equalization process described in connection with FIGS. 1 and 2.

DETAILED DESCRIPTION OF THE DRAWINGS

Figure 1:
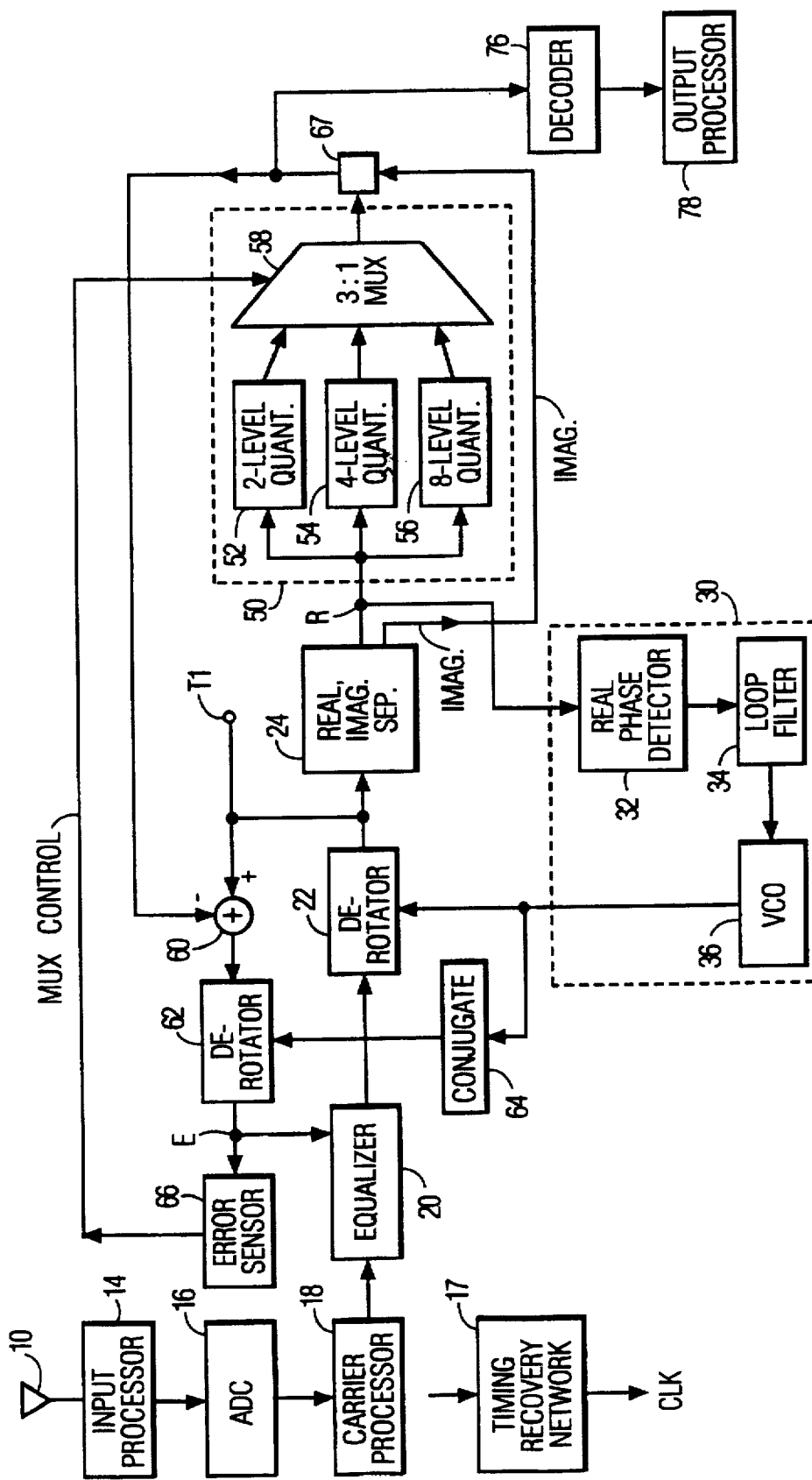
FIG. 1 is a block diagram of a portion of an advanced television receiver, such as a HDTV receiver, including phase detector apparatus in accordance with the principles of the invention.

In FIG. 1, a broadcast VSB modulated analog HDTV signal received by an antenna 10 is processed by an input network 14 including RF tuning circuits, a double conversion tuner for producing an intermediate frequency passband output signal, and appropriate gain control circuits, for example. The received VSB signal illustratively is an 8-VSB signal with a symbol rate of 10.76 Msymbols/second occupying a conventional NTSC 6 MHz frequency spectrum, in accordance with the Grand Alliance HDTV specification. The Nyquist bandwidth for this system is 5.38 MHz, with excess bandwidth of 0.31 MHz at each bandedge.

The passband output signal from input processor 14 is converted from analog to digital form by an analog-to-digital converter 16, which operates at a sample rate of 2 samples/symbol, for example. The received VSB signal in this example does not include a pilot component or a training component, and has been processed by unit 14 so that the center of the 6 MHz band is nominally situated at 5.38 MHz. The frequency spectrum of this signal at the input of ADC 16 occupies a range of 2.38 MHz to 8.38 MHz. When timing synchronization has been established by means of a timing recovery network 17, ADC unit 16 samples this signal at 21.52 MHz, which is twice the symbol rate. Timing recovery network 17 provides an output symbol clock (CLK) that is synchronized with a corresponding clock generated at a transmitter. Clock CLK is applied to ADC unit 16 and other elements of the receiver system. Techniques for achieving timing recovery are well known. One particularly advantageous timing recovery technique suitable for use by network 17 is disclosed in a copending U.S. patent application Ser. No. 08/704,787 of C. Strolle et al. titled Carrier Independent Timing Recovery System for a Vestigial Sideband Modulated Signal.

In the system to be discussed, the carrier frequency of the transmitted signal is nominally 5.38 MHz, the transmitted symbol frequency is nominally 10.76 Msymbols/sec, and the receiver sampling frequency is nominally 21.52 Mhz. At timing lock, the receiver sampling frequency is twice the transmitted symbol frequency. At carrier lock when demodulation to baseband results, the recovered carrier frequency is one-quarter of the receiver sampling frequency.

The digital signal from ADC unit 16 is applied to a carrier processor 18. Processor 18 includes a carrier recovery network of conventional design for providing a VSB output signal that is demodulated to near-baseband. Carrier recovery networks suitable for this purpose are known in the art. A particularly suitably carrier recovery network for use in unit 18 is described in a copending U.S. patent application of C. Strolle et al. Ser. No. 08/702,529 titled Carrier Recovery System for a Vestigial Sideband Signal. In the system to be discussed, demodulation to absolute baseband is accomplished by means of a blind equalizer network together with a second carrier recovery network, without reliance on a pilot signal to assist carrier recovery or a training signal to assist equalization. The input VSB signal to be processed is a complex signal with real and imaginary components, and may be of the type used by the Grand Alliance HDTV transmission system. Only the real component of the VSB signal contains data symbols to be recovered.

The near-baseband VSB output signal from processor 18 contains digital data as well as inter-symbol interference (ISI) caused by transmission channel disturbances and artifacts. This signal is applied to an input of a complex, adaptive feed-forward passband equalizer 20, eg., a fractionally spaced equalizer, which in this case is implemented as a digital FIR filter. Equalizer 20 operates in a "blind" mode during signal acquisition, and afterwards operates in a decision directed mode. The coefficient values (tap weights) of equalizer 20 are adaptively controlled by an Error signal "E" applied to a control input as will be discussed.

Initial blind equalization of the input VSB signal from processor 18 is performed on the VSB symbol constellation by what may be considered to be a modified version of the RCA algorithm. Specifically, the inventors have realized that blind equalization of a VSB signal can be accomplished by using a one dimensional version of the RCA algorithm which is appropriate for a VSB signal. The algorithm which is employed determines appropriate decision regions for a VSB decision device so as to generate decisions which allow an adaptive equalizer to converge without using a training signal.

It will be helpful to define several terms before describing the process of blind equalization in greater detail. A "decision region" is a continuous portion of the real number range and has upper and lower bounds. An "unbounded decision region" is a decision region with either positive infinity for an upper bound or negative infinity for a lower bound. A symbol point is situated in a decision region if it has a value less than the upper bound and greater than the lower bound. A decision region "spans" a symbol point if the symbol point is situated in the decision region. A "decision device," such as a quantizer, determines which decision region an incoming symbol point is in, and outputs a symbol corresponding to that decision region. A "step" is the distance between two adjacent symbols in a full constellation. As noted above, a VSB signal is essentially a one-dimensional data constellation wherein only one axis contains quantized symbol data to be recovered at a receiver.

In a VSB system, a decision region typically spans one data symbol of the full constellation. The upper and lower bounds of each decision region are set midway between the constellation sample points. If these decision regions are used for initial convergence of the equalizer, convergence will not occur because, due to the presence of ISI, significantly less than 90% of the decisions from the decision device will be correct.

A blind equalization algorithm, as will be discussed, determines new upper and lower decision region boundaries in the process of forcing some correct decisions to be made. The full VSB constellation is clustered into several sets, and upper and lower bounds for decision regions are determined. These first sets are subdivided into smaller sets until each set contains only one symbol and the decision regions correspond to typical VSB decision regions. Decision boundaries are typically located halfway between symbols within decision regions. Each decision stage, eg., a quantizer, allows a number of decisions to be correct so that the equalizer approaches convergence. Thus each decision stage in the blind equalization process serves to progressively open the "eye" of the VSB signal as convergence is approached.

The upper and lower bounds of each decision region are determined in the following manner. For a given cluster of symbols, the lower bound of a given decision region is set at a value that is one-half a step less than the value of the smallest symbol in that cluster. However, if the smallest symbol is the smallest valued symbol of the constellation, then the lower bound is set to negative infinity. The upper bound of the decision region is set at a value that is one-half a step greater than the value of the largest symbol in the cluster (unless the symbol is the largest valued symbol in the constellation, in which case the upper bound is set to a value of positive infinity). If an output symbol from the equalizer resides in one of these decision regions, the output of the decision device is taken to be the arithmetic mean of the data symbols of the associated cluster.

When a locally generated error signal is less than a predetermined quantizer threshold level, meaning that the decision region evaluation can be refined, the decision regions are changed by dividing each cluster of symbols in half. The upper and lower bounds of the new decision regions and the decision device output are recomputed in the manner described above.

The process described above is illustrated by the following example for an 8-VSB signal. The signal format adopted by the Grand Alliance HDTV system employs an 8-VSB signal having a one dimensional data constellation defined by the following eight data symbols:

−7 −5 −3 −1 +1 +3 +5 +7

This one-dimensional constellation is conveyed by the real, in-phase component of the VSB signal. With this symbol arrangement, the symbols are all evenly spaced two units apart, and data bits can be mapped to symbols without incurring a DC offset.

The blind equalization process example given above encompasses three stages, or levels, in which input data symbols are grouped or "clustered" three different ways and respectively subjected to progressively finer quantization steps by associated quantization decision devices. The first (coarse) clustering of the eight symbol VSB constellation points occurs at a first level of equalization involving a coarse quantization step, and produces two symbol clusters:

[−7, −5, −3, −1] and [1, 3, 5, 7]

For this operation the slice point of the quantizer is set to zero and the data sign (+ or −) is detected. The coarse quantization step decision regions for each of these clusters are respectively

[−infinity, 0] and [0, +infinity].

In this case the outputs of the coarse quantizer decision devices are respectively

[−4] [+4].

The next level of (finer) clustering at the next level of equalization produces the following four symbol clusters:

[−7, −5] [−3, −1] [1, 3] [3, 5]

The finer quantization step decision regions for these clusters are respectively

[−inf, −4] [−4, 0] [0, 4] [4, inf]

In this case the outputs of the finer resolution decision devices are respectively

[−6] [−2] [2] [6].

The last level of refinement at the last level of equalization produces symbol clusters

[−7] [−5] [−3] [−1] [1] [3] [5] [7]

with finest decision regions

[−inf, −6] [−6, −4] [−4, −2] [−2, 0] [0, 2] [2, 4] [4, 6] [6, inf].

The finest resolution decision device outputs are thus the full VSB constellation:

−7 −5 −3 −1 1 3 5 7.

The decision outputs produced by the quantizers are provided by an input-to-output mapper (look-up table). The use of such a mapper is well known in quantizer design. This example for an 8-VSB signal began with two clusters of four symbol samples. It could also have begun with one cluster of eight symbols. An analogous operation pertains to a 16-VSB signal. A 16-VSB signal may begin with four clusters of four symbols or with two clusters of eight symbols. As between successive coarse and finer regions, decision region values are typically related by a factor of one-half, but this relationship is not critical.

The process described above is summarized by FIG. 4, which shows clusters, decision regions and decision device outputs for blind equalization of an 8-VSB signal. These operations are performed by a network 50 in FIG. 1 as will be discussed, including quantizers 52, 54 and 56 and a multiplexer (MUX) 58 for providing an output datastream of time multiplexed symbols.

A modification of the processes described above may sometimes be necessary for VSB signals. A problem arises when some but not all of the decision regions in a set of decision regions are unbounded. For VSB signals the outermost positive and negative decision regions are unbounded. Due to transmission channel disturbances, it is possible that more points may fall into the unbounded regions than would normally be the case without channel distortions. This situation creates a bias in the output of the decision device. To overcome this bias, the range of the unbounded decision regions are shortened slightly, and the range of the bounded decision regions are simultaneously increased. These regions are shortened and lengthened by an amount needed to achieve the optimum offset values mentioned in the following paragraph. These values are usually a small percentage of the total decision region. This adjustment makes the selection of all decision regions equiprobable.

This bias adjusting procedure is illustrated by the following example, in the context of the 8-VSB system described above. In the four cluster stage for example, the decision region values are modified by multiplying by an offset scalar factor "Δ" having a value slightly greater than unity, for example. The value of the offset may vary with the nature and requirements of a particular system. The purpose of the offset is to narrow the range of intermediate decision regions. The offset is not used with the outermost values at the positive and negative extremes of a decision region, eg., positive or negative infinity. Thus in the case of the second symbol clustering discussed above, the decision regions are modified as follows:

[−inf., −4*Δ] [−4*Δ, 0] [0, 4*Δ] [4*Δ, +inf.].

The decision device outputs are similarly modified:

−6*Δ −2*Δ 2*Δ 6*Δ

The offset scalar value can be determined by experimentation. Optimum offset values for each stage of equalization (clustering level) are found by minimizing transients in the RMS error when the quantizer switches from two clusters to four clusters and from four clusters to eight clusters. These values are often empirically determined. In some cases the offset value of the output device and the offset value of the decision region may differ. Analogous observations apply to a 16-VSB signal.

Figure 2:
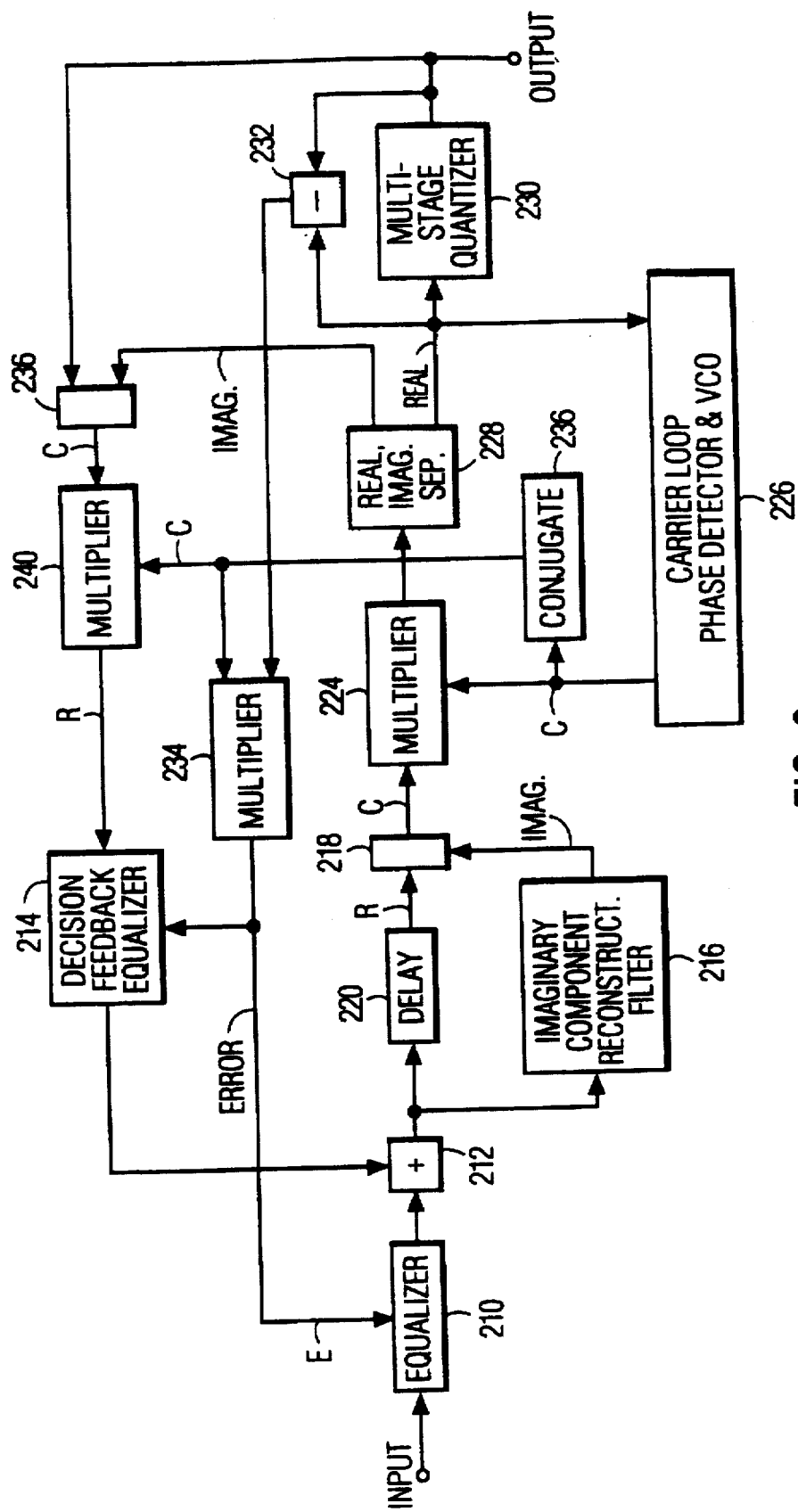
FIG. 2 is a block diagram of another embodiment of a receiver system including carrier recovery phase detector apparatus in accordance with the principles of the present invention.

The operation of the system shown in FIG. 1 will now be discussed. In this embodiment, equalizer 20 is implemented as an FIR filter with adjustable taps, although other adaptive filter structures may be used. Equalizer 20 is a complex unit with complex input and output. However, equalizer 20 may be a real-only filter which processes only the in-phase real component of the input signal and which has a single real output. A real-only equalizer filter arrangement is shown in FIG. 2 as will be discussed.

The output signal from equalizer 20 is applied to a first (de-)rotator 22, which is of conventional configuration and operates in a well-known manner to compensate for phase errors of an input signal in response to a control signal. Rotator 22, a complex multiplier, is included in a secondary carrier recovery network also including a phase detector network 30 and a network 24 for separating the in-phase real and quadrature imaginary components of the output signal from rotator 22. Networks for separating the real and imaginary components of a complex signal are well-known. The secondary carrier recovery network typically removes residual phase errors in the output signal of equalizer 20 to produce a baseband signal. The secondary carrier recovery network advantageously augments a prior carrier recovery network in processor 18 which typically removes frequency offsets, but which may lack the power to remove all frequency and phase offsets.

The separated real component from network 24 is processed by a real phase detector 32 in network 30 as will be shown and discussed in connection with FIG. 3. An output signal from detector 32 is representative of a phase error of the detector input signal, which is related to the output signal of equalizer 20. The detector 32 output signal is filtered by loop filter 34 (eg., an integrator) to produce a voltage proportional to the phase error. A Voltage Controlled Oscillator (VCO) 36 produces a frequency proportional to this voltage. Thus the output of VCO 36 is a complex signal whose frequency and phase are proportional to the phase error of the output signal from the adaptive equalizer. The output signal from VCO 36 controls the operation of derotator 22 to compensate for phase errors in the output signal of equalizer 20. Specifically, rotator 22 modifies the phase of the input signal as a function of the VCO output signal so as to reduce the phase error to zero.

Using well-known signal processing techniques, the control signal from network 30 is conjugated by unit 64 to remove the imaginary component of the complex control signal from network 30. The resulting real-only control signal from unit 64 is applied to a control input of a second (de-)rotator 62 which will be discussed subsequently. The separated real component from unit 24 is applied to an input of network 50 for processing. Unit 67 processes the separated imaginary component from unit 24 with an output real signal from network 50 to reconstitute a complex signal.

Network 50 is a multistage decision device comprising three parallel quantizer stages (decision devices) 52, 54 and 56 which provide quantized data to a 3:1 time multiplexer 58. Network 50 provides the symbol clustering, decision regions and decision outputs described above as summarized in FIG. 4. The 2-level quantizer 52 is used initially during the first (coarse) level of equalization. When the RMS value of a passband error signal E developed at the output of second rotator 62 exceeds a predetermined threshold as sensed by a comparator network in a sensor 66, a Multiplexer (MUX) Control signal is generated by sensor 66. This Control signal causes MUX 58 in network 50 to select the output from the next (finer) level quantizer, eg., from 4-level quantizer 54 at the second level of equalization. The equalizer responds to information derived from the use of this quantizer until the RMS error exceeds a predetermined second threshold as also sensed by sensor 66. A Multiplixer Control signal generated for this condition causes network 50 to select the output from the next and last (finest) level quantizer, 8-level quantizer 56 at the third and final level of equalization in this example. Quantizer 56 covers the full 8-VSB constellation. At this point it is expected that equalizer 20 should be able to converge fully.

The input to the non-inverting (+) input of combiner 60 is the complex signal before quantization, and the input to the inverting (−) input of combiner is the complex signal after quantization of the real component. Thus the output signal from combiner 60 represents the before and after quantization difference, or the offset/error from the desired quantization level. This signal represents a baseband phase error. Rotator 22 and rotator 62 are similar complex rotators which rotate in opposite directions (i.e., clockwise and counter-clockwise). The difference in rotating direction is caused by the conjugation of the signal applied to the control input of rotator 62 compared to rotator 22. Error signal E developed at the output of rotator 62 represents the passband phase error that equalizer 20 is intended to remove by adjusting its coefficients in response to error signal E.

Network 50 may use a single adaptive quantizer with a controllable quantization level instead of three separate quantizers 52, 54 and 56 as shown. An equalized baseband signal is decoded by unit 76 and processed by an output processor 78. Decoder 76 may include, for example, de-interleaver, Reed-Solomon error correction, and audio/video decoder networks as known. Output processor 78 may include audio and video processors and audio and video reproduction devices. In a system using a trellis decoder, an input to the trellis decoder may be taken from terminal T1 at the output of first rotator 22.

The system shown in FIG. 2 also performs blind equalization of a near-baseband VSB signal, but uses a real-only equalizer rather than a complex equalizer as used in FIG. 1. In FIG. 2, the real component of a received VSB signal is applied to an input of an adaptive real-only feed-forward equalizer 210. The coefficients of equalizer 210 are adjusted in response to an error signal E (as will be discussed). The real output signal of equalizer 210 is combined in adder 212 with a real output signal from a decision feedback equalizer 214. A filter network 216 reconstructs the imaginary quadrature phase component of the real VSB signal component from the real output of adder 212. This reconstruction is accomplished using known Hilbert transform techniques and is based on the fact that the in-phase real component and the quadrature imaginary component of a VSB signal approximately form a Hilbert transform pair. Unit 218 combines the reconstructed quadrature component from filter 216 and the real component from unit 212 to produce a reconstructed complex VSB signal with an equalized real component. Delay element 220 compensates for a time delay associated with the operation of reconstruction filter 216 to assure that the input signals arrive at adder 218 with time coincidence.

The complex VSB signal from unit 218 is processed by a multiplier (rotator) 224 which operates in the same manner as rotator 22 in FIG. 1, and likewise responds to a complex output signal produced by a VCO in a secondary carrier recovery network 226 corresponding to unit 30 in FIG. 1. As in the case of FIG. 1, carrier recovery network 226 responds to the separated real component of the output signal from rotator 224 as provided by a real/imaginary component separator 228. The real component from unit 228 is processed by a multi-stage quantizer decision network 230 corresponding to network 50 in FIG. 1. An equalized baseband VSB signal appears at the output of quantizer 230 and is conveyed to subsequent signal processing circuits (not shown).

The real input and output signals of quantizer 230 are differenced by a subtractor 232, and the resulting real signal is applied to an input of multiplier 234. The output signal of subtractor represents the difference between the real input signal to quantizer 230 and the quantized real output signal from quantizer 230. Another input of multiplier 234 receives the real signal output from subtractor 232. The imaginary component separated by unit 228 and the equalized real component from the output of quantizer 230 are combined by unit 236 to produce a complex VSB signal which is applied to a signal input of multiplier 240. Another input of multiplier 240 receives a real signal from a conjugation network 236, which inverts the imaginary component in the complex output signal of unit 226.

The output of multiplier 240 is a real passband signal (only the real output of complex multiplier is used). This signal is applied to a signal input of decision feedback equalizer 214, and a control input of equalizer 214 receives an Error output signal (E) from multiplier 234. This Error signal represents a passband error signal and is also applied to input equalizer 210 as a coefficient control signal. The output of equalizer 214 is real and is combined in a unit 212 with the equalized real output signal of equalizer 210. Feedback equalizer 214 removes remaining intersymbol interference not removed by forward equalizer 210. Decision feedback equalizers are well-known. Multi-stage quantizer 230 may be controlled by means of a MUX Control signal in the same manner as shown in FIG. 1, by sensing the Error signal to develop the MUX Control signal which is applied to a multiplexer associated with quantizer 230 as described in connection with FIG. 1.

Figure 3:
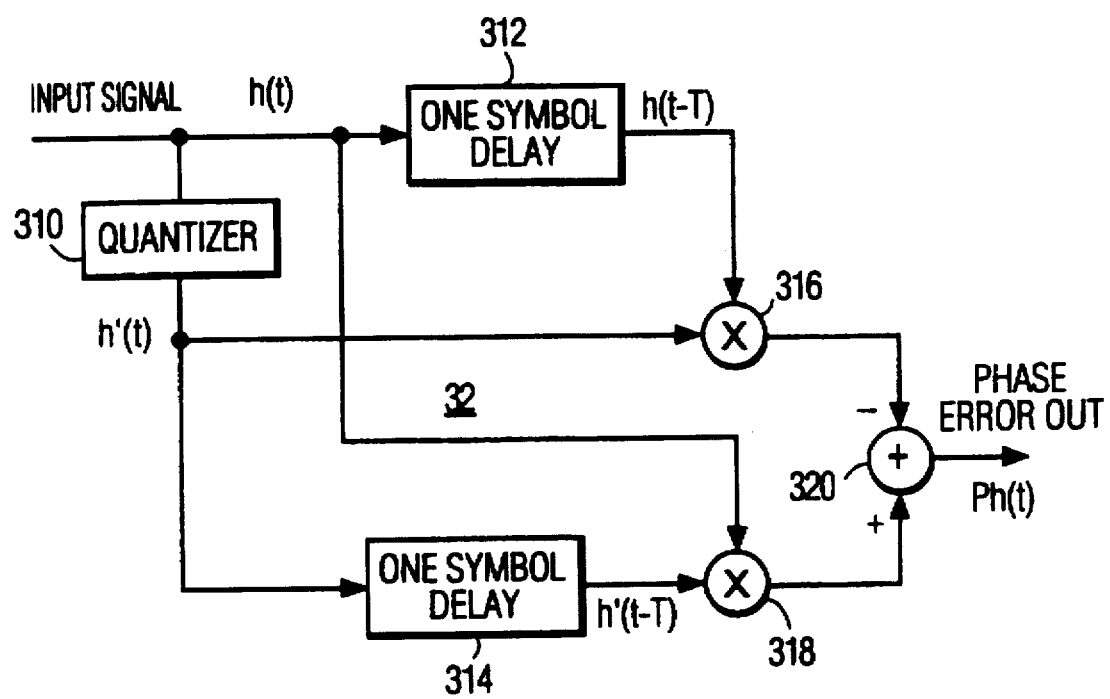
FIG. 3 shows details of a phase detector circuit in accordance with the principles of the present invention.

Phase detector 32 of network 30 in the secondary carrier recovery loop of FIG. 1, and in the corresponding network 226 in FIG. 2, is shown in detail in FIG. 3. Phase detector 32 measures the phase error of the carrier using only the real component of the VSB signal, and produces an output signal that is proportional to the sine of the carrier phase error. Phase detector 32 essentially detects any quadrature phase component in the real component input to the phase detector. Any such quadrature distortion of the real component represents a phase offset error that is manifested at the output of phase detector 32.

The phase detector includes a quantizer 310, symbol delay elements 312 and 314, multipliers 316 and 318, and a subtractive combiner 320 arranged as shown. Quantizer 310 is an eight level quantizer in the case of on 8-VSB signal, a sixteen level quantizer in the case of a 16-VSB signal, and so forth. Delay elements 312 and 314 compensate for a transit time delay associated with the operation of quantizer 310, so that signals arrive at multipliers 314 and 316 in time synchronism. Phase detector 32 is a low latency phase detector with a small (one symbol) delay between input and output, producing good noise tracking.

The phase detector generates a Phase Error Output signal Ph(t) which is proportional to the sine of the phase (angular) error of input signal h(t). This signal is a rotated version of the adaptive equalizer output signal as can be seen from FIG. 1. Phase detector output signal Ph(t) is defined by the expression $$Ph(t)=h(t)*h'(t-T)-h'(t)*h(t-T)$$

where h'(t) is the output of quantizer decision device 310, h(t) is the output of the adaptive equalizer after rotation, and T is a symbol period. Phase detector output signal Ph(t) is proportional to the sine of its input signal, not to a timing offset. The sine function is not a mathematical sine function per se, but results from the shape of the input-output transfer function of phase detector 32.

We claim:

1. In a system for receiving a vestigial sideband (VSB) video signal formatted as a one-dimensional constellation of data symbols representing digital image data and subject to exhibiting a carrier offset, apparatus comprising:

a carrier recovery network (22,30) for shifting said received VSB signal toward baseband; and a phase detector (32) in said carrier recovery network, including an input for receiving a near baseband VSB signal;

a quantizer (310) responsive to said input VSB signal for producing a quantized VSB signal;

a symbol delay network (312,314) for delaying said input VSB signal and for delaying said quantized signal;

a first multiplier (316) responsive to said quantized VSB signal and to a symbol delayed signal from said delay network, for producing a first signal;

a second multiplier (314) responsive to said input VSB signal and to a symbol delayed quantized signal from said delay network, for producing a second signal; and a combiner for subtractively combining said first and second signals to produce a phase error representative signal.

2. Apparatus according to claim 1, wherein said input VSB signal exhibits a real component exclusive of an imaginary component.

3. Apparatus according to claim 1 and further comprising:

a timing recovery network for providing a symbol clock in synchronism with a transmitter clock so that said input signal to said phase detector exhibits timing lock.

4. Apparatus according to claim 1 and further including:

a signal equalizer (20) having an input for receiving a transmitted VSB signal, an output coupled to said carrier recovery network, and a control input for receiving a control signal that is a function of said error signal.

5. Apparatus according to claim 4 and further including:

an additional carrier recovery network (18) with an input for receiving a transmitted VSB signal and an output coupled to said equalizer input.

6. Apparatus according to claim 1, wherein
said input VSB signal is an N-level VSB signal; and
said quantizer exhibits N quantization levels.

7. Apparatus according to claim 1, wherein:
said delay network exhibits a one symbol delay.

* * * * *